United States Patent
Kanno

(10) Patent No.: US 9,524,029 B2
(45) Date of Patent: Dec. 20, 2016

(54) INDETERMINABLE GESTURE RECOGNITION USING ACCUMULATED PROBABILITY FACTORS

(71) Applicant: CASIO COMPUTER CO., LTD., Shibuya-ku, Tokyo (JP)

(72) Inventor: Hiroki Kanno, Tokyo (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 167 days.

(21) Appl. No.: 13/942,896

(22) Filed: Jul. 16, 2013

(65) Prior Publication Data
US 2014/0059500 A1 Feb. 27, 2014

(30) Foreign Application Priority Data

Aug. 23, 2012 (JP) .................................. 2012-183919

(51) Int. Cl.
*G06F 3/01* (2006.01)
*G06F 3/0482* (2013.01)
(Continued)

(52) U.S. Cl.
CPC ............. *G06F 3/017* (2013.01); *G06F 3/0481* (2013.01); *G06F 3/0482* (2013.01);
(Continued)

(58) Field of Classification Search
USPC ........................................................ 715/863
See application file for complete search history.

(56) References Cited

U.S. PATENT DOCUMENTS

| 5,913,221 A | 6/1999 | Kano et al. |
| 7,430,008 B2 | 9/2008 | Ambiru et al. |

(Continued)

FOREIGN PATENT DOCUMENTS

| CN | 101410781 | 4/2009 |
| JP | 06-208654 | 7/1994 |

(Continued)

OTHER PUBLICATIONS

Office Action of Notification of Reason(s) for Rejection for Japanese Patent Application No. 2012-183919 dated Jul. 2, 2015, 10 pages.

(Continued)

*Primary Examiner* — Kieu Vu
*Assistant Examiner* — Roberto Borja
(74) *Attorney, Agent, or Firm* — Amin, Turocy & Watson LLP; Gregory Turocy

(57) ABSTRACT

The present invention is to appropriately determine a gesture operation detected to perform data processing according thereto. In the present invention, a CPU judges a processing status at the time of the detection of a gesture operation performed on a touch panel, and after determining its gesture operation type according to the processing status, performs data processing according to the operation type. In this case, the CPU determines and evaluates a gesture operation type for each processing status, and updates values (evaluation accumulation values) of a flick priority pointer and a tap priority pointer. Then, based on these values of the flick priority pointer and the tap priority pointer, the CPU determines one of the gesture operation types (flick operation/tap operation).

7 Claims, 10 Drawing Sheets

(51) Int. Cl.
*G06F 3/0481* (2013.01)
*G06F 3/0485* (2013.01)
*G06F 3/0488* (2013.01)
*G06F 3/048* (2013.01)

(52) U.S. Cl.
CPC ........ G06F 3/0485 (2013.01); G06F 3/04883 (2013.01); G06F 3/048 (2013.01)

(56) References Cited

U.S. PATENT DOCUMENTS

| | | | |
|---|---|---|---|
| 7,437,005 B2 * | 10/2008 | Drucker | G06F 3/0483 382/205 |
| 7,614,019 B2 | 11/2009 | Ribikauskas et al. | |
| 7,627,834 B2 | 12/2009 | Ribikauskas et al. | |
| 7,761,814 B2 | 7/2010 | Ribikauskas et al. | |
| 8,219,936 B2 | 7/2012 | Kim et al. | |
| 8,952,972 B2 | 2/2015 | Yamamoto et al. | |
| 2004/0046886 A1 * | 3/2004 | Ambiru et al. | 348/333.12 |
| 2006/0055662 A1 | 3/2006 | Ribikauskas et al. | |
| 2006/0055684 A1 | 3/2006 | Ribikauskas et al. | |
| 2006/0055685 A1 | 3/2006 | Ribikauskas et al. | |
| 2007/0177804 A1 | 8/2007 | Elias et al. | |
| 2008/0036743 A1 * | 2/2008 | Westerman et al. | 345/173 |
| 2009/0265670 A1 * | 10/2009 | Kim | G06F 3/04883 715/863 |
| 2010/0251116 A1 | 9/2010 | Ribikauskas et al. | |
| 2011/0157048 A1 | 6/2011 | Nakatani | |
| 2012/0092355 A1 * | 4/2012 | Yamamoto | G06F 3/04883 345/522 |
| 2012/0229409 A1 | 9/2012 | Ohashi et al. | |
| 2013/0002601 A1 * | 1/2013 | McCracken | G06F 3/0416 345/174 |
| 2013/0147841 A1 * | 6/2013 | Coussemaeker | G06F 3/0484 345/634 |
| 2013/0219340 A1 * | 8/2013 | Linge | G06F 3/04883 715/834 |
| 2013/0222305 A1 * | 8/2013 | Kanno | G06F 3/0484 345/173 |
| 2014/0245236 A1 * | 8/2014 | Kimura | 715/863 |
| 2015/0253856 A1 * | 9/2015 | de los Reyes | G06F 3/04883 |

FOREIGN PATENT DOCUMENTS

| | | |
|---|---|---|
| JP | 2004-355426 | 12/2004 |
| JP | 2006-085703 | 3/2006 |
| JP | 2011-118629 | 6/2011 |
| JP | 2011-134212 | 7/2011 |
| JP | 2012-104095 | 5/2012 |

OTHER PUBLICATIONS

Japanese Office Action for Japanese Patent Application No. 2012-183919 mailed on Nov. 18, 2015.
Takahashi. "The brains of application developer of iPhone OS", SofwareDesign, Gijutsu-Hyohron Co., Ltd., Japan, the 308th issue, Publication 242th, Nov. 24, 2010.
Tio. "Usage of Perfect Viewer -ab", Amedamablog, Feb. 4, 2011, http://www.amedama.com/blog/20110204250.html.
Chinese Office Action for Chinese Patent Application No. 201310371472.3 mailed on Jan. 8, 2016.

* cited by examiner

FIG. 3

GM IMAGE MEMORY

| No. | IMAGE ID | IMAGE ATTRIBUTE | | | |
|---|---|---|---|---|---|
| | | FOLDER | PRINT | EXTEND | EXTENSION ERROR |
| 1 | 01001 | FAVORITE | NOT PRINTED | NOT EXTENDED | — |
| 2 | 00011 | FAVORITE | PRINTED | EXTENDED | — |
| ⋮ | ⋮ | ⋮ | ⋮ | ⋮ | ⋮ |

INDETERMINABLE GESTURE RECOGNITION USING ACCUMULATED PROBABILITY FACTORS

CROSS-REFERENCE TO RELATED APPLICATION

This application is based upon and claims the benefit of priority from the prior Japanese Patent Application No. 2012-183919, filed Aug. 23, 2012, the entire contents of which are incorporated herein by reference.

BACKGROUND OF THE INVENTION

1. Field of the Invention

The present invention relates to a data processing device and a method of performing data processing according to a gesture operation.

2. Description of the Related Art

Conventionally, for data processing devices such as portable terminal devices, there have been technologies in which whether a flick operation has been performed is judged based on the motion of a gesture operation itself on a touch panel. These technologies include, for example, a technology of judging whether a flick operation has been performed or a tap operation has been performed based on a relation between a contact start point and a contact end point on a touch panel (Japanese Patent Application Laid-Open (Kokai) Publication No. 2011-118629), a technology of judging whether a drag operation has been performed or a flick operation has been performed based on the threshold of the distributed status of touched points (Japanese Patent Application Laid-Open (Kokai) Publication No. 2011-134212), and a technology of judging whether a flick operation has been performed based on threshold judgment regarding an operation motion and speed (Japanese Patent Application Laid-Open (Kokai) Publication No. 2006-085703).

However, in these technologies, whether a flick operation has been performed is judged based merely on the operation motion of a gesture itself (based on a physical operation status), and therefore there is a possibility of resulting in an erroneous judgment. That is, since even gesture operations of the same type have a subtle difference in motion from time to time, there is a possibility of resulting in a gesture judgment contrary to the user's intension, or in other words, an erroneous judgment. For example, even when the user thinks he or she has performed a flick operation, it may be judged as a tap operation. Similarly, even when the user thinks he or she has performed a tap operation, it may be judged as a flick operation.

SUMMARY OF THE INVENTION

An object of the present invention is to appropriately determine' a gesture operation detected to perform data processing according thereto.

In accordance with one aspect of the present invention, there is provided a data processing device including a detection section which detects a gesture operation, comprising: a judging section which judges a processing status of the data processing device based on time of detection of the gesture operation by the detection section; a determining section which determines one of a plurality of gesture operation types according to the processing status judged by the judging section; and a data processing section which performs data processing according to a gesture operation type determined by the determining section.

In accordance with another aspect of the present invention, there is provided a data processing device including a detection section which detects a gesture operation, comprising a judging section which judges an attribute of an operation target at time of detection of the gesture operation by the detection section; a determining section which determines one of a plurality of gesture operation types according to the attribute of the operation target judged by the judging section; and a data processing section which performs data processing according to a gesture operation type determined by the determining section.

According to the present invention, it is possible to appropriately determine a gesture operation detected to perform data processing according thereto, which allows an operation to be performed as intended by the user.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a diagram for describing an image memory GM;

DETAILED DESCRIPTION OF THE PREFERRED EMBODIMENTS

Embodiments of the present invention are described in detail below with reference to the drawings.

<First Embodiment>

First, a first embodiment of the present invention is described with reference to FIG. 1 to FIG. 7.

Figure 1:
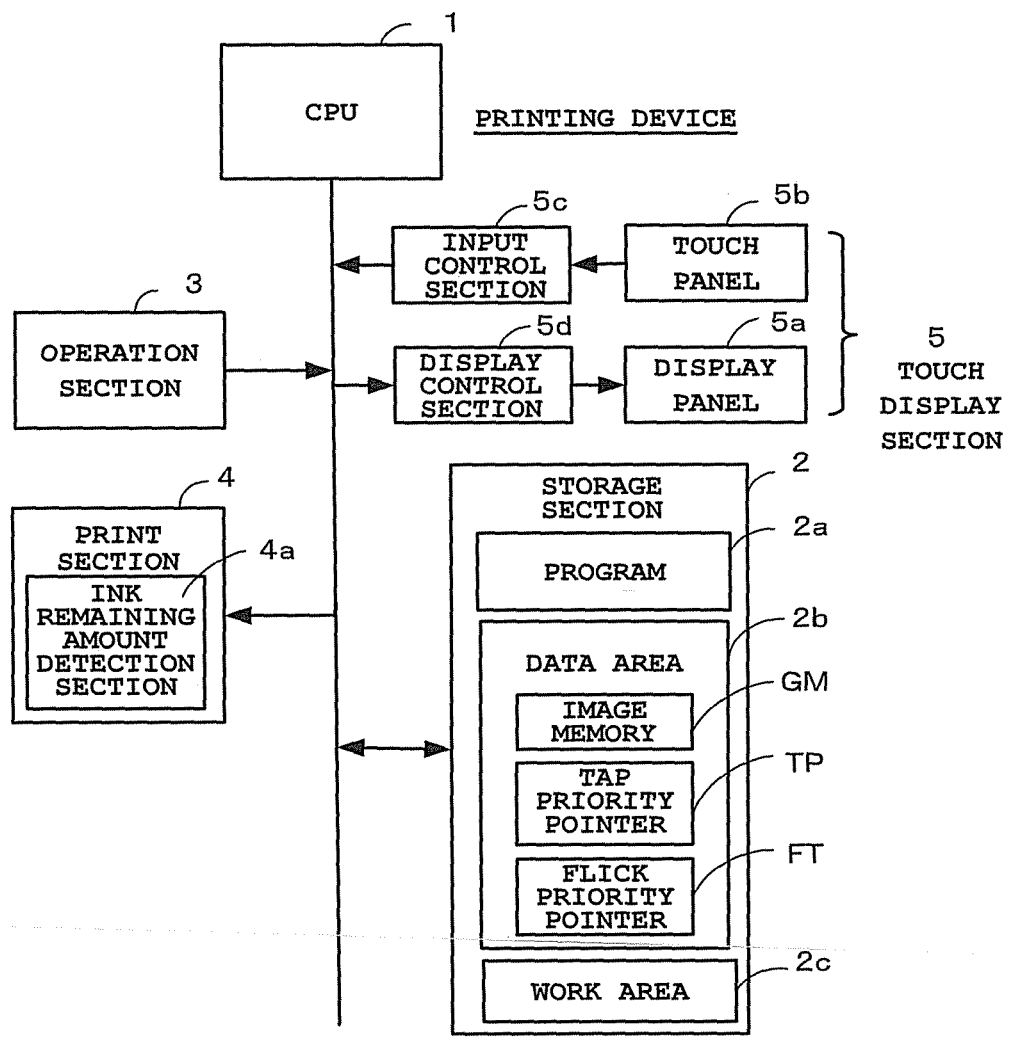
FIG. 1 is a block diagram depicting basic components of a home printing device equipped with a touch screen.

The present embodiment is an example in which the present invention has been applied as a data processing device to a home printing device equipped with a touch screen, and FIG. 1 is a block diagram depicting basic components of the printing device.

The data processing device (printing device) has a function for creating an address book, a printing function for printing images, text, addresses, and the like, and an editing function for editing photographic images, text, and the like, which allows addresses and text to be easily printed for New Year's cards and the like. The touch screen is provided in order to improve operability.

A CPU 1 in FIG. 1 is a central processing unit which operates by receiving power from a power supply section (omitted in the drawing), and controls the entire operation of the printing device according to various programs in a storage section 2. The storage section 2 is structured to have a program area 2a for storing various programs such as those for operations depicted in flowcharts of FIG. 4 to FIG. 7 described further below, a data area 2b for storing various data (such as image data, address book data, and text data) required in this printing device, and a work area 2c for temporarily storing a flag and the like. The data area 2b has an image memory GM, a tap priority pointer TP, and a flick priority pointer FP, which will be described further below. The storage section 2 maybe structured to include a portable recording medium such as an SD card, or a storage area of another server device (omitted in the drawing).

An operation section 3 includes various push-button-type keys such as a power supply switch key for turning power ON/OFF, a cursor key for moving a cursor upward, downward, leftward, and rightward, and a print key for instructing start of printing. The CPU 1 performs processing according to a key operation signal from this operation section 3. A print section 4 is an inkjet printer that performs high-definition printing by directing a jet of color inks (yellow, magenta, and cyan) at a paper sheet, and includes an ink remaining amount detection section 4a which detects an ink remaining amount (%) for each color ink and provides the remaining amount of each ink to the CPU 1. As a result of this configuration, the remaining amount of each ink is displayed always or as required for guidance.

A touch display section 5, which forms a touch screen, is structured by a touch panel 5b being laminated on a display panel 5a. This touch display section 5 includes an input control section 5c and a display control section 5d, and displays function names serving as software keys (soft keys) and various icons. The display panel 5a is a high-definition liquid crystal display or an organic EL (Electro-Luminescence) display having a screen with an uneven aspect ratio.

When a gesture operation is performed with a finger or a pen on the touch panel 5b, the input control section 5c detects a contact point and inputs its coordinate data. Note that, although a capacitive type or a resistive film type is adopted herein, any other type may be adopted. Also, this gesture operation on the touch panel 5b is an operation for indicating a contact point, a contact movement, a contact direction, and the like by the movement of a finger or a pen.

The input control section Sc detects a moving direction or moving speed of a finger or the like based on temporal changes of a signal according to a contact point on the touch panel 5b or detects that a contacted finger or the like has been lifted off the touch panel 5b, and provides an input event to the CPU 1. Then, the CPU 1 determines the type of the gesture operation on the touch panel 5b, and performs data processing according to the type.

Here, in the first embodiment, two types of gesture operations on the touch panel 5b are exemplarily described. One is a gesture operation in which a finger or the like touches an arbitrary point on the touch panel 5b and immediately moves away from this point (tap operation), and the other is a gesture operation in which a finger or the like touches and moves on the touch panel 5b and immediately moves away from the touch panel 5b (flick operation). However, as a matter of course, a gesture operation of another type may be performed.

Note that the gesture operation herein is not limited to a contact operation (touch operation) on the touch panel 5b and includes, as an operation similar to the contact operation, a non-contact operation for which the position of a finger or a pen is detected according to change in capacitance or brightness due to the approach or approaching movement of the finger or the pen. That is, not only a contact-type touch panel which detects a contact operation but also a non-contact-type touch panel or an operation detection device which detects a non-contact operation may be used. In the present embodiment, however, a contact operation on a contact-type touch panel is exemplarily described as a gesture operation.

Figure 2:
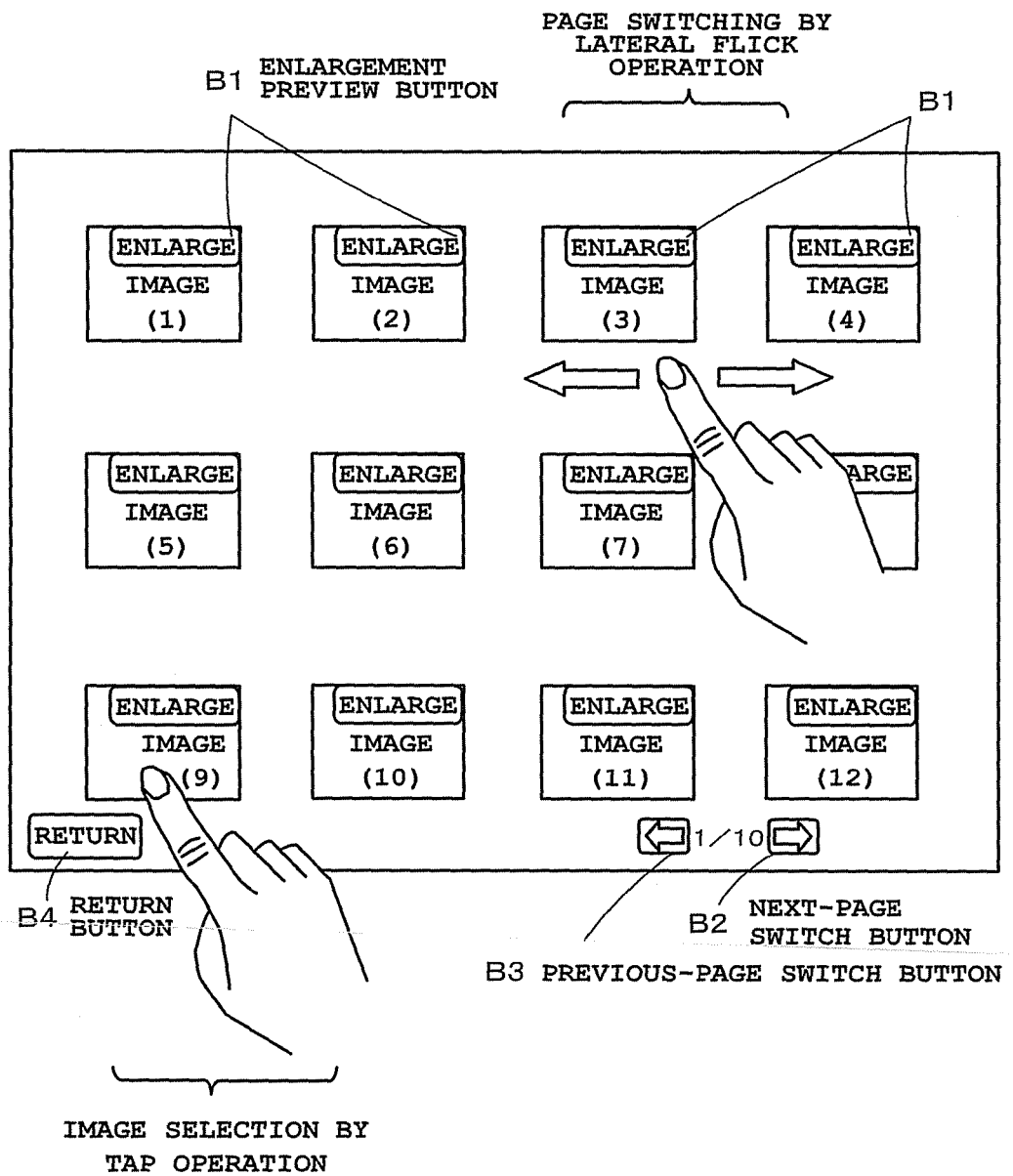
FIG. 2 is a diagram depicting a thumbnail screen.

FIG. 2 is a diagram depicting a thumbnail screen on which photographic images externally supplied from an SD card or the like are reduced in size and displayed in a list form.

In the thumbnail screen exemplarily depicted in the drawing, a plurality of images (1) to (12) are arranged and displayed in a matrix with three rows and four columns, and an enlarged-preview button B1 for instructing the enlargement of an image is arranged and displayed on the upper right corner of each image. Also, in a vacant area in the thumbnail screen, a next-page switch button B2, a previous-page switch button B3, and a return button B4 for ending thumbnail display are arranged. Between the next-page switch button B2 and the previous-page switch button B3, a current page/total number of pages, such as ¹⁄₁₀, is displayed for guidance.

On the thumbnail screen structured as described above, when some gesture operation is performed, the CPU 1 determines the type of the gesture operation (gesture operation type), and performs image selection processing if the gesture operation is a tap operation, or performs page switch processing if the gesture operation is a flick operation. In the example depicted in the drawing, a tap operation has been performed on the image (9). Also, a flick operation in an arrow direction (right direction) and a flick operation in an arrow direction (left direction) have been performed near the image (3) and (4). When these gesture operations are performed, the CPU 1 determines a current processing status at the time of the detection of each gesture operation, and after determining a gesture operation type according to the processing status, performs data processing according to the gesture operation type.

Here, examples of the "processing status" described above include, as will be described in detail further below, a processing status indicating whether a predetermined time has passed after the displaying of predetermined data, a processing status indicating whether the ink remaining amount is almost insufficient, a processing status indicating whether a gesture operation has been performed on an image, a processing status indicating whether a predetermined image is present at a operation point where a gesture operation has been performed, a processing status indicating whether the current state has been achieved via a sliding state (contact movement state), and a processing status indicating whether display data is being processed.

As will be described further below, as a matter of course, the processing status is not limited to those described above. Also, when a gesture operation type is that of a tap operation, data processing according to the gesture operation type is image selection processing for selecting an image subjected to the tap operation and enlarging and displaying the selected image. When a gesture operation type is that of a flick operation, data processing according to the gesture operation type is page switch processing for switching to a thumbnail screen of the next page or a thumbnail screen of the preceding page according to the flick direction. However, as will be described further below, the data processing is not limited thereto.

FIG. 3 is a diagram for describing the image memory GM.

The image memory GM is to store and manage information regarding photographic images of various types read and obtained from an SD card or the like, and is structured to have a "No." field representing serial numbers, an "image ID" field representing image identification information, and an "image attribute" field. The "image attribute" field includes a "folder" field representing a folder where an image has been stored, a "print" field indicating whether an image has been printed, a "extend" field indicating whether extension processing (enlarged display) has been performed, and an "extension error" field indicating whether an error has occurred at the time of extension processing.

In the example depicted in the drawing, for example, an image with "No." of 1 has "image ID" of "01001". Its "folder" field of "image attribute" indicates "favorite", and its "print" field indicates "not printed". Also, its "extend" field indicates "not extended", and its "extension error" field indicates "— (none)".

Next, the operation concept of the printing device in the first embodiment is described with reference to flowcharts depicted in FIG. 4 to FIG. 7. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

FIG. 4 to FIG. 7 are flowcharts outlining the operation of a characteristic portion of the present embodiment from among all of the operations of the printing device. After exiting the flows of FIG. 4 to FIG. 7, the procedure returns to the main flow (omitted in the drawings) of the entire operation.

Figure 4:
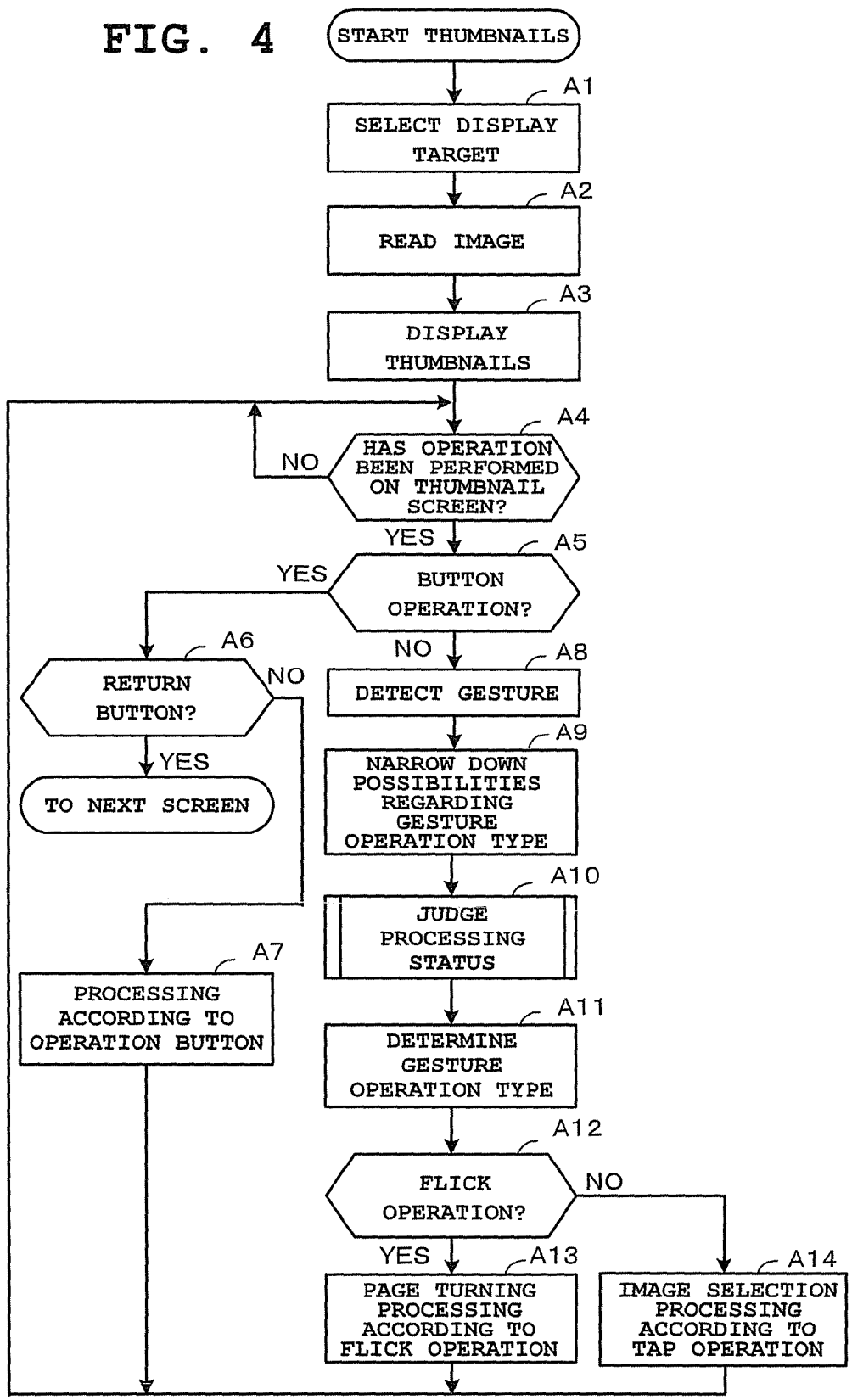
FIG. 4 is a flowchart that is started in response to a display specification on the thumbnail screen.

FIG. 4 is a flowchart that is started in response to a display specification on the thumbnail screen.

First, when a desired image folder is selected and designated as a target for thumbnail display from a menu screen (Step A1), the CPU 1 reads out each image in the folder (for example, a favorite folder) (Step A2), and after generating a thumbnail screen such as that depicted in FIG. 2, displays it on the touch display section 5 (Step A3).

Initially, as a thumbnail screen of the first page, the first to twelfth images are displayed in a list and matrix form. In this state, the CPU 1 judges whether an operation (a button contact operation or a gesture operation) has been performed on the thumbnail screen (Step A4), and enters and remains in a wait state until an operation is performed.

When an operation is performed on the thumbnail screen (YES at Step A4), the CPU 1 judges whether the contact point is within one of the arrangement areas of the buttons B1 to B4 (Step A5). When the operation is a contact operation on one of the arrangement areas of the buttons B1 to B4 (YES at Step A5), the CPU 1 judges whether this operation button is the return button B4 (Step A6).

When judged that the return button B4 has been operated (YES at Step A6), the CPU 1 cancels the thumbnail screen, and returns to the next screen (for example, a menu screen). When judged that one of the buttons B1 to B3 other than the return button B4 has been operated (NO at Step A6), the CPU 1 performs processing corresponding to this operation button B1, B2, or B3 (Step A7). For example, when the enlarged-preview button B1 has been operated, the CPU 1 performs enlargement processing on an image in this button area and causes the enlarged image to be displayed for preview.

Also, when the next-page switch button B2 has been operated, the CPU 1 causes a thumbnail screen of the next page to be displayed by switching. When the previous-page switch button B3 has been operated, the CPU 1 causes a thumb nail screen of the previous page to be displayed by switching. Then, the CPU 1 returns to Step A4 described above, and enters a state of waiting for an operation.

At Step A5, when the operation is not an operation on the buttons B1 to B4 (NO at Step A5), the input control section 5c detects the contact point on the touch panel 5b, assuming that a gesture operation has been performed. Also, the input control section Sc detects the moving direction or moving speed of the finger or the like based on temporal changes of a signal according to the contact point, and then detects that the contacted finger or the like has been lifted off the touch panel 5b (Step A8).

Then, by detecting the details of the gesture operation as described above, the input control section Sc narrows down possibilities regarding the type of the gesture operation (narrows down the possibilities to a tap operation or a flick operation), and provides an input event according to the gesture operation to the CPU 1 (Step A9). When the input event indicating the gesture operation is received, the CPU 1 determines a processing status at the time of the gesture operation (Step A10), and performs processing for determining the type of the gesture operation based on the processing status (Step A11).

That is, upon retrieving an input event indicating the gesture operation from the details of the gesture operation on the touch display section 5, the CPU 1 determines the type of the gesture operation by referring to the current processing status so as to determine whether the input event is true or false.

Figure 5:
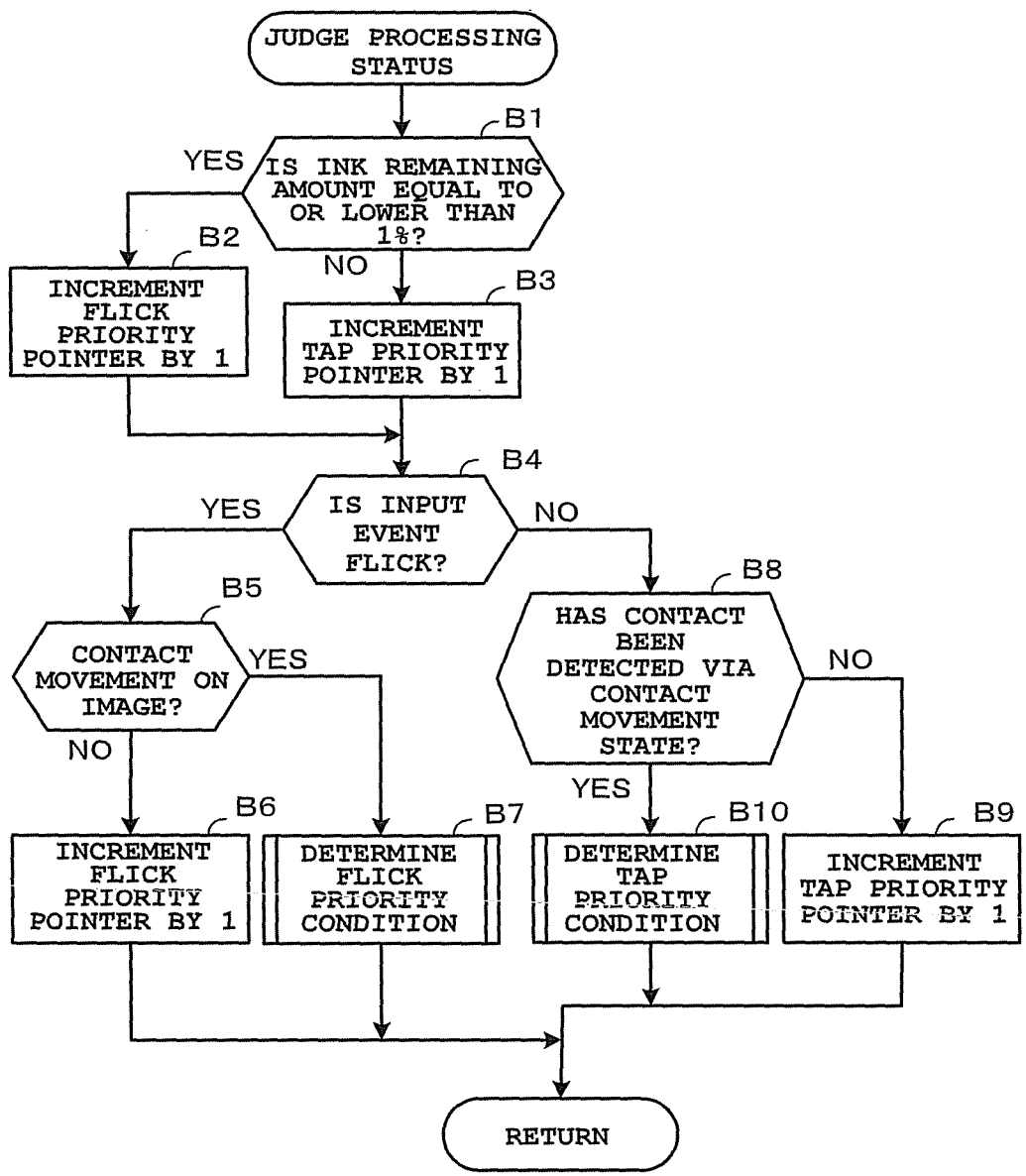
FIG. 5 is a diagram for describing processing for judging a processing status when a gesture operation is performed.

FIG. 5 is a diagram for describing processing for judging a processing status at the time of a gesture operation (Step A10 of FIG. 4).

First, the CPU 1 obtains a remaining amount for each ink from the ink remaining amount detection section 4a of the print section 4 to judge whether the remaining amount is almost insufficient (for example, 1%) (Step B1). When the remaining amount is equal to or lower than 1% indicating that it is almost insufficient (YES at Step E1), the CPU 1 performs update processing for incrementing the value of the flick priority pointer FP by "1" (Step B2). When the ink remaining amount exceeds 1% (NO at Step E1), that is, when the ink remaining amount is sufficient, the CPU 1 performs update processing for incrementing the value of the tap priority pointer TP by "1" (Step B3).

The flick priority pointer FP and the tap priority pointer TP herein are to store a determination evaluation point (evaluation accumulation value) for a gesture operation type for each of a plurality of types of processing statuses. The flick priority pointer FP is a pointer whose value (evaluation accumulation value) is updated when a processing status at the time of a gesture operation has a high possibility of performing a flick operation. The tap priority pointer TP is a pointer whose value (evaluation accumulation value) is updated when a processing status at the time of a gesture operation has a high possibility of performing a tap operation.

Here, the ink remaining amount is displayed always or as required for guidance. Therefore, if the user has confirmed based on this remaining amount display that the remaining amount is almost insufficient, there is a low possibility of selecting and printing an image. Accordingly, the gesture operation in this case has a high possibility of being a flick operation rather than a tap operation for selecting an image, and therefore the value of the flick priority pointer FP is updated. If the ink remaining amount is sufficient, there is a high possibility of performing a tap operation, and therefore the value of the tap priority pointer TP is updated.

Next, the CPU 1 judges whether the input event from the input control section 5c is a flick (Step B4). When a flick input event has been received (YES at Step B4), the CPU 1 judges whether a contact movement on the image has been detected based on a change of the contact point (Step B5). Here, when a contact movement on the image has not been detected (NO at Step B4), there is a higher possibility of performing a flick operation for making an instruction for turning a page than a tap operation for selecting the image, and therefore the CPU 1 performs update processing for incrementing the value of the flick priority pointer FP by "1" (Step B6). On the other hand, when a contact movement on the image has been detected (YES at Step B5), the possibility of a flick operation is prioritized. However, there still is a possibly of a tap operation, and therefore the CPU 1 proceeds to flick priority condition determination processing as further determination processing (Step B7).

Figure 6:
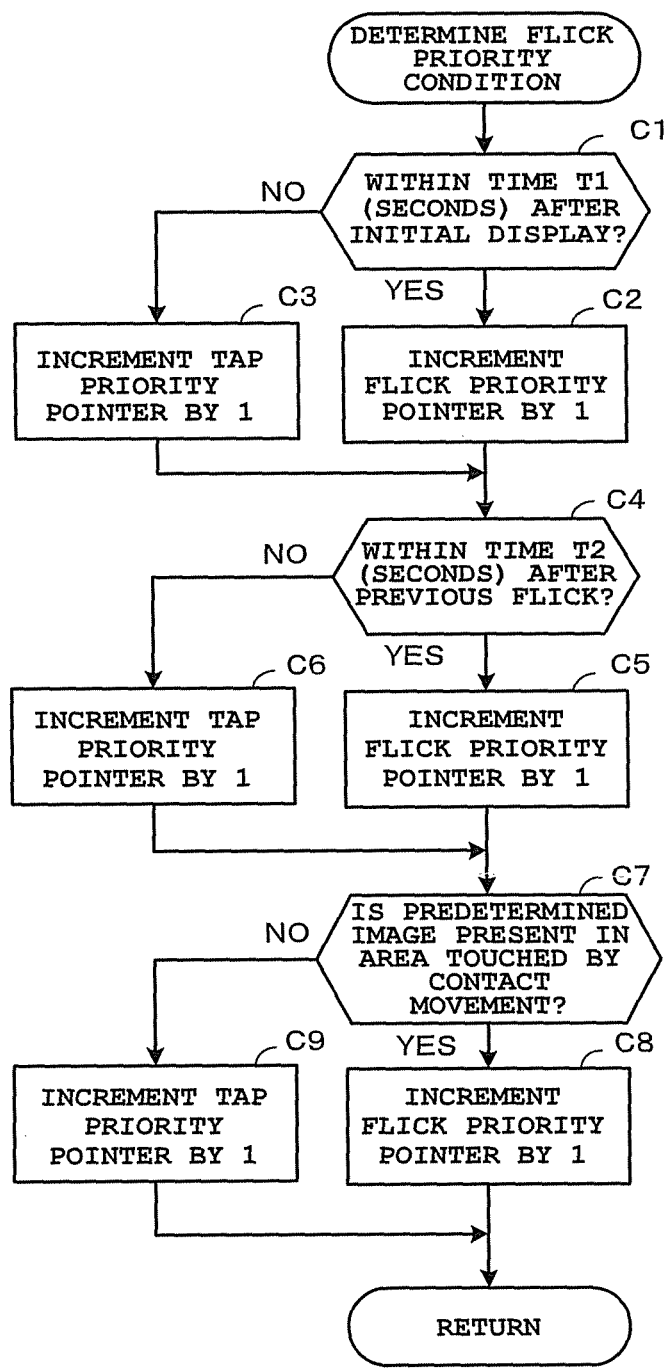
FIG. 6 is a flowchart for describing in detail flick priority condition determination processing.

FIG. 6 is a flowchart for describing flick priority condition determination processing (Step B7 of FIG. 5) in detail.

First, the CPU 1 checks whether the contact movement has been detected within a time T1 (for example, two seconds) after the initial display (after the display of the initial thumbnail screen after power-up) (Step C1). Here, if the time is within two seconds after the display of the initial thumbnail screen (YES at Step C1), there is a high possibility of performing a flick operation for page switching, and therefore the CPU 1 performs update processing for incrementing the value of the flick priority pointer FP by "1" (Step C2). If the time exceeds two seconds after the display of the initial thumbnail screen (NO at Step C1), there is a high possibility of a tap operation for selecting, enlarging, and displaying an image, and therefore the CPU 1 performs update processing for incrementing the value of the tap priority pointer TP by "1" (Step C3).

Next, the CPU 1 judges whether the contact movement has been detected within a time T2 (for example, two seconds) from the previous flick operation (Step C4). In this case as well, if the time is within two seconds after the previous display (YES at Step C4), there is a high possibility of performing a flick operation, and therefore the CPU 1 performs update processing for incrementing the value of the flick priority pointer FP by "1" (Step C5). If the time exceeds two seconds after the previous display (NO at Step C4), there is a high possibility of a tap operation for selecting, enlarging, and displaying an image, and therefore the CPU 1 performs update processing for incrementing the value of the tap priority pointer TP by "1" (Step C6).

Next, the CPU 1 judges whether one of a printed image, a non-extended image, and an extension-error image serving as a predetermined image is present at the area touched by the contact movement (Step C7). That is, after specifying an image based on the display position of an image present at the area subjected to the contact movement, the CPU 1 refers to an image memory GM to read the attribute of the image and, according to this attribute, the CPU 1 judges whether the image is a printed image, a non-extended image, or an extension-error image. As such, the CPU 1 determines the attribute of the image present at the area touched by the contact movement. This is because of the following reason.

That is, the reason is that a printed image has a low possibility of being selected again and printed, a non-extended image, which is an image not previously selected, has a low possibility of being selected in the future, and an extension-error image is an image which has caused an error somehow when selected for enlargement and has a low possibility for the user knowing this error to select the thumbnail image again for extension. As such, when the contact movement has been performed on an image with a low possibility of being selected (YES at Step C7), the CPU 1 performs update processing for incrementing the value of the flick priority pointer FP by "1" (Step C8). When the contact movement has not been performed on an image such as this (NO at Step C7), the CPU 1 performs update processing for incrementing the value of the tap priority pointer TP by "1" (Step C9).

At Step B4, when the input event is not a flick (NO at Step B4 of FIG. 5), or in other words, when the input event is a tap operation, the CPU 1 judges whether the contact has been detected via a contact movement state (Step B8). If the contact has not been detected via a contact movement state (NO at Step B8), there is a high possibility of a tap operation, and therefore the CPU 1 performs update processing for incrementing the value of the tap priority pointer TP by "1" (Step B9). On the other hand, if the contact has been detected via a contact movement state (YES at Step B8), the possibility of a tap operation is prioritized. However, there still is a possibly of a flick operation, and therefore the process proceeds to tap priority condition determination processing as further determination processing (Step B10).

Figure 7:
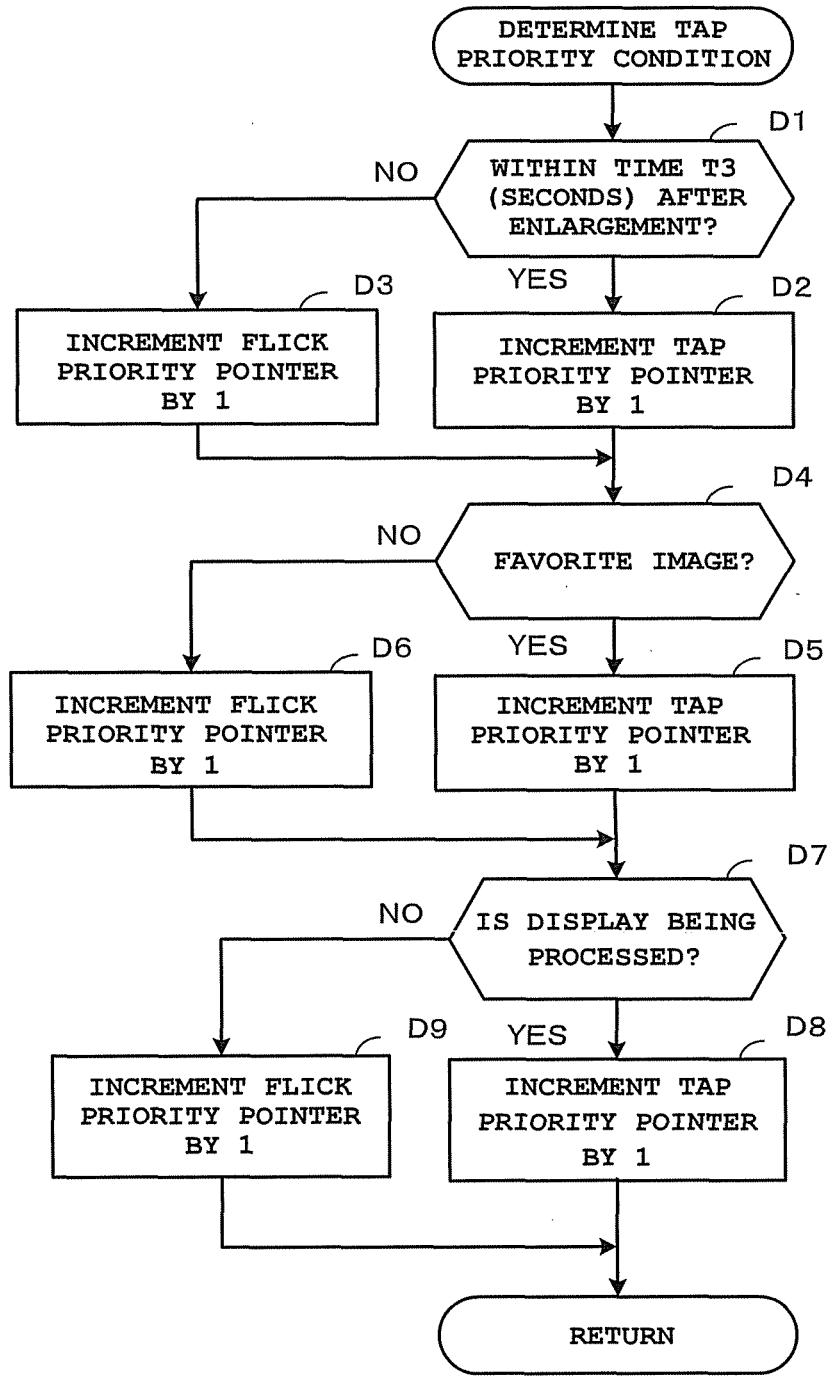
FIG. 7 is a flowchart for describing in detail tap priority condition determination processing.

FIG. 7 is a flowchart for describing tap priority condition determination processing (Step B10 of FIG. 5) in detail.

First, the CPU 1 judges whether the contact has been detected within a time T3 (for example, two seconds) after enlarged-preview display (Step D1). In this case, the user confirming an image by enlargement preview display has a high possibility of printing after a tap operation for selecting that image. Therefore, if the contact has been detected within two seconds after enlarged display (YES at Step D1), the CPU 1 performs update processing for incrementing the value of the tap priority pointer TP by "1" (Step D2). If the contact has been detected in the time exceeding two seconds after enlarged display (NO at Step D1), the CPU 1 performs update processing for incrementing the value of the flick priority pointer FP by "1" (Step D3).

Next, the CPU 1 judges whether the image at the contact point is in a favorite folder (Step D4). That is, after specifying the image from the display position of the contacted image, the CPU 1 refers to the image memory GM to read out the attribute of the image to judge whether the image is in a favorite folder. In this case, an image in the favorite folder has a high possibility of being selected. Accordingly, if the image is in the favorite folder (YES at Step D4), the CPU 1 performs update processing for incrementing the value of the tap priority pointer TP by "1" (Step D5). If the image is not in the favorite folder (NO at Step D4), the CPU 1 performs update processing for incrementing the value of the flick priority pointer FP by "1" (Step D6).

Next, the CPU 1 judges whether the image at the contacted and detected point is being processed (Step D7). Here, "the image is being processed" means that enlarged-preview display or rotated display is being performed. If the contact has been detected during such image processing (YES at Step D7), there is a high possibility of a tap operation for cancelling the image display, and therefore the CPU 1 performs update processing for incrementing the value of the tap priority pointer TP by "1" (Step D8). If the contact has not been detected during such image processing (NO at Step D7), the CPU 1 performs update processing for incrementing the value of the flick priority pointer FP by "1" (Step D9).

When the processing for judging the processing status is ended (Step A10 of FIG. 4), the CPU 1 performs processing for determining the gesture operation type according to the processing status (Step A11). In this case, the CPU 1 determines the gesture operation type according to a result of comparison between the value of the flick priority pointer FP and the value of the tap priority pointer TP. That is, when the value of the flick priority pointer ET is equal to or larger than the value of the tap priority pointer TP, the CPU 1 determines that a flick operation has been performed. When the value of the flick priority pointer FP is smaller than the value of the tap priority pointer TP, the CPU 1 determines that a tap operation has been performed.

After the processing for determining the gesture operation type (flick operation/tap operation) (Step A11), the CPU 1 judges whether the gesture operation type is a flick operation (Step A12). When the gesture operation type is a flick operation (YES at Step A12), for example, the CPU 1 switches the page of the thumbnail screen. Here, the CPU 1 switches the current thumbnail screen to a thumbnail screen of the next page or a thumbnail screen of the previous page according to the detected flick direction (contact movement direction) (Step A13).

When performing display scrolling by a flick operation, the CPU 1 performs display scrolling in a left or right direction according to the flick direction (contact movement direction). At Step A12, when the gesture operation type is a tap operation (NO at Step A12), the CPU 1 performs image selection processing for selecting an image for enlarged display (Step A14). Hereafter, the CPU 1 returns to Step A4, and repeats the above-described operations every time some operation is performed on the thumbnail screen.

As described above, in the first embodiment, the CPU 1 judges a processing status at the time of the detection of a gesture operation on the touch panel 5b, and after determining its gesture operation type according to the processing status, performs data processing according to the operation type. Thus, a gesture operation can be determined based not only on a result of the detection of details of the operation but also on the processing status at that time. With such a precise determination, the user's desired operation can be performed.

Also, in the first embodiment, the flick priority pointer FP and the tap priority pointer TP are provided which store, for each of the gesture operation types, a determination evaluation point (evaluation accumulation value) for a gesture operation type. The CPU 1 determines and evaluates a gesture operation type for each processing status to update the value (evaluation accumulation value) of the flick priority pointer FP or that of the tap priority pointer TP, and compares the values of the flick priority pointer FP and the tap priority pointer TP, whereby one of the gesture operation types is determined. Thus, a gesture operation type can be appropriately determined according to plural types of processing statuses, whereby a more accurate determination can be made.

Moreover, as a processing status, the CPU 1 determines a time-elapsed status after predetermined data is displayed. For example, the CPU 1 judges whether a contact movement has been detected within the time T1 from the initial display, whether a contact movement has been detected within the time T2 from the previous flick operation, and whether contact has been detected within the time T3 after enlarged-preview display, and determines one of the gesture operation types according to the time-elapsed status. As a result of this configuration, a gesture operation type such as that having a high possibility of being operated within a predetermined time can be appropriately determined based on a relation between the lapse of time and the operation.

Furthermore, as a processing status, the CPU 1 determines a display data status indicating whether data being displayed in the display screen is being processed (for example, during enlarged-preview display or during rotated display), and determines one of the gesture operation types according to the display data status. As a result of this configuration, a gesture operation type such as that having a high possibility of being operated during data processing can be appropriately determined based on a relation between data processing and the operation.

Still further, as a processing status, the CPU 1 determines the attribute status of an image in an operated area when a gesture operation is detected (for example, a printed image, a non-extended image, an extension-error image, or a favorite image), and determines one of the gesture operation types according to the attribute status. For example, a printed image, a non-extended image, and an extension-error image have a low possibility of being selected, and a favorite image has, by contrast, a high possibility of being selected. In the configuration of the first embodiment, a gesture operation type can be appropriately determined based on this image attribute relation.

Yet still further, as a processing status, the CPU 1 determines a operation position status indicating whether a gesture operation has been performed on an image, and determines one of the gesture operation types according to the operation position status. When a gesture operation has been performed on an image, the possibility of it being selected is high, and therefore the gesture operation type can be appropriately determined.

Yet still further, the CPU 1 determines a gesture operation type according to a result of the detection of details of the operation on the touch display section 5 detected by the input control section 5c. Thus, a gesture operation on the touch display section 5 can be determined.

In the above-described first embodiment, after retrieving an input event indicating a gesture operation type from a result of the detection of details of the operation on the touch display section 5, the CPU 1 determines the gesture operation type by referring to the current processing status so as to determine whether the input event is true or false. However, a configuration may be adopted in which the CPU 1 starts processing for determining a gesture operation type according to a processing status on condition that it is not possible to narrow down to one gesture operation type based on a result of the detection of details of the gesture operation. With this configuration where the CPU 1 does not perform the processing for determining a gesture operation type according to a processing status every time a gesture operation is performed, but performs the processing as required, the number of unnecessary determinations can be reduced, and determination can be more smoothly made.

Also, a configuration may be adopted in which, from a result of the detection of details of a gesture operation performed on the touch display section 5, the CPU 1 designates a combination of a plurality of gesture operation types as a determination candidate, and then performs processing for determining the gesture operation type according to a processing status. For example, the CPU 1 may designate, as a determination candidate, a combination of a tap operation and a flick operation which are similar gesture operations, or a combination of a flick operation and a slide operation which are also similar gesture operations, and then specifies one of the gesture operation types from the determination candidate according to a processing status.

In the case where a combination of a flick operation and a slide operation is designated as a determination candidate and a processing status is determined based on whether the entire display data is within the touch display section 5, if the entire display data is not within the touch display section 5, there is a high possibility of display scrolling, and therefore the gesture operation type can be determined as a slide operation (drag operation) where a contact movement is made. If the entire display data is within the touch display section 5, there is a high possibility of page turning, and therefore the gesture operation type can be determined as a flick operation. As such, in the first stage, the CPU 1 designates a plurality of similar gesture operation types (a slide operation and a flick operation) as a determination candidate. Then, in the second step, the CPU 1 makes a determination by specifying one of the gesture operation types from the determination candidate according to a processing status. As a result of this configuration, a more reliable determination can be made.

The above description is not limited to the case where a plurality of gesture operation types is designated as a determination candidate. Even in the case of one gesture operation type, different data processing may be performed according to a processing status at the time of operation detection. That is, in the case where a processing status is based on whether the entire display data is within the touch display section 5, display scroll processing may be performed if the entire display data is not within the touch display section 5 when a flick operation is performed, and page switch processing may be performed if the entire display data is within the touch display section 5.

Moreover, in the above-described first embodiment, the CPU 1 judges whether an image at a contacted and detected point is being processed. However, the CPU 1 may judge not only whether an image is being processed but also whether an image has just been processed. Also, the judgment target is not limited to an image, and the CPU 1 may judge whether display data such as text, page, and window is being processed, or whether display data has just been processed.

Furthermore, in the above-described first embodiment, a printed image, non-extended image, an extension-error image, and a favorite image are given as the attributes of an image. However, the attributes are not limited thereto. For example, image selection frequency and the number of times of selection maybe used as attributes of the image. In this case, an image with high selection frequency or large number of times of selection is judged to have a high possibility of being selected, and a tap operation is judged as a gesture operation.

Still further, in the above-described first embodiment, the CPU 1 detects a gesture operation based on the details of the gesture operation on the touch display section 5. However, a gesture operation may be detected based not only on a gesture operation on the touch display section 5 but also on a user image captured by an imaging section (omitted in the drawings).

Yet still further, the processing status of the above-described first embodiment is a current processing status at the time of the detection of a gesture operation. Alternatively, a series of processing statuses up to a current point by reference to the time of the detection of a gesture operation (such as the course of processing) may be used.

<Second Embodiment>

A second embodiment of the present invention is described below with reference to FIG. 8 to FIG. 10.

In the above-described first embodiment, a gesture operation type is determined according to a processing status at the time of the detection of a gesture operation for a printing device. By contrast, in the second embodiment, a gesture operation type is determined according to the attribute of an operation target (such as an image, icon, or window) at the time of the detection of a gesture operation for a tablet terminal device. Note that sections that are basically the same or have the same name in both embodiments are given the same reference numerals, and therefore explanations thereof are omitted. Hereafter, the characteristic portion of the second embodiment will mainly be described.

Figure 8:
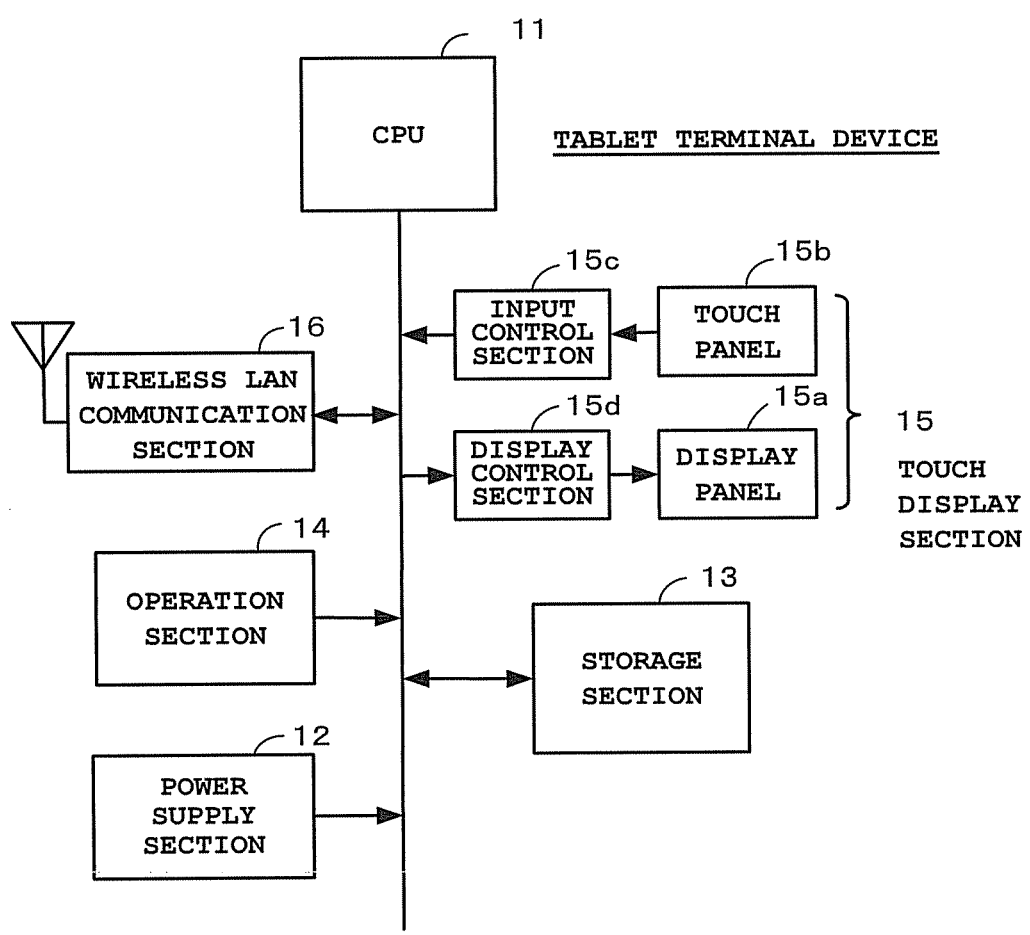
FIG. 8 is a block diagram depicting basic components of a tablet terminal device.

FIG. 8 is a block diagram depicting basic components of the tablet terminal device of the second embodiment.

This tablet terminal device is a portable information terminal device whose housing is of A5 size as a whole, which includes basic functions such as a touch input function and a wireless communication function. A CPU 11 in FIG. 8 operates by receiving power from a power supply section (a secondary battery) 12, and controls the entire operation of the tablet terminal device according to various programs in a storage section 13. This CPU 11 includes a CPU (Central Processing Unit), a memory, and the like not shown.

Figure 10:
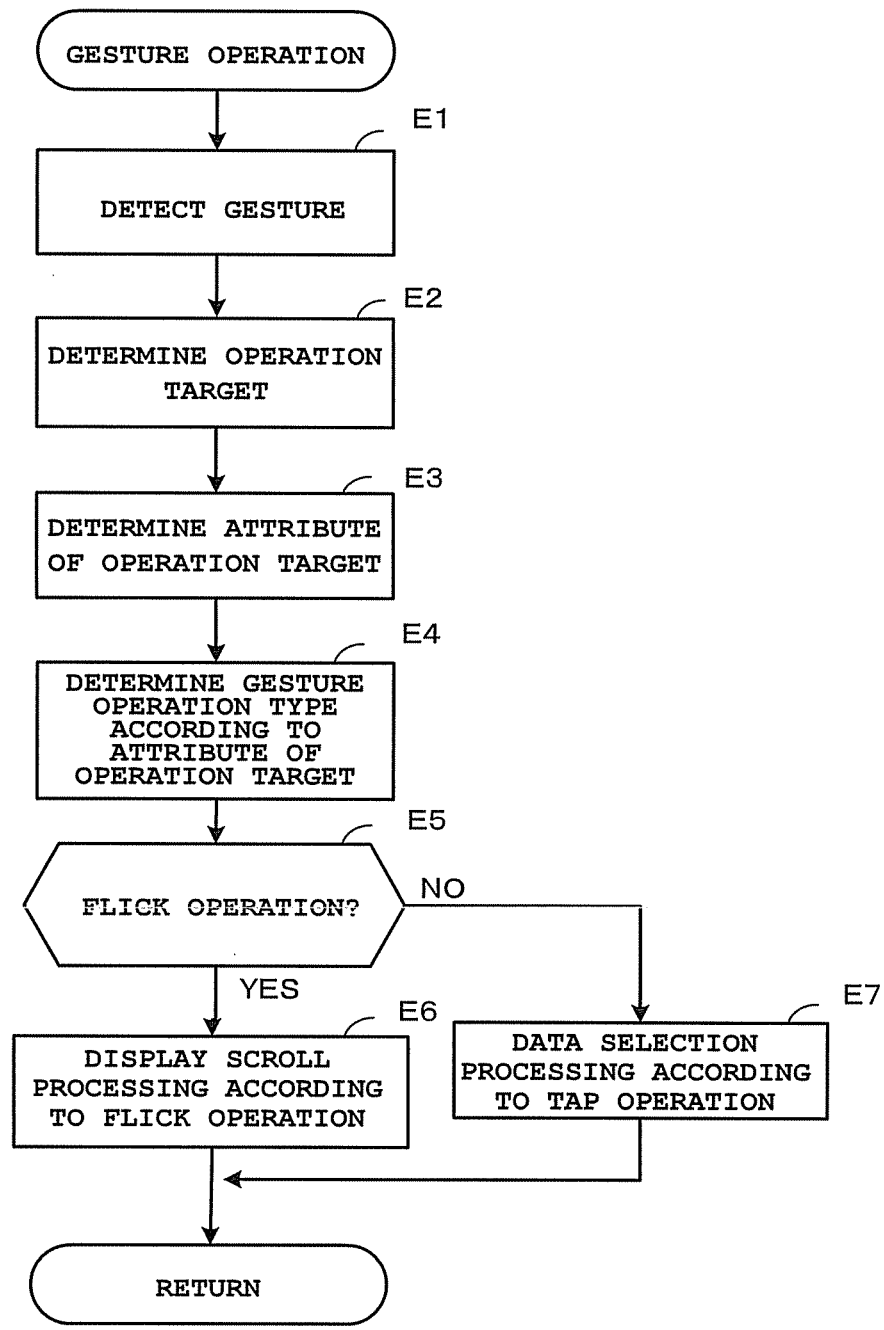
FIG. 10 is a flowchart of an operation of the tablet terminal device that is started in response to a gesture operation.

The storage section 13 is structured to include a ROM (Read-Only Memory), a flash memory, or the like, and have stored therein programs and various applications for achieving the present embodiment according to an operation procedure depicted in FIG. 10. The storage section 13 maybe structured to include, for example, a removable portable memory (recording medium) such as an SD card or IC card. Although not shown, the storage section 13 may include a storage area on a predetermined server device side in a case where the tablet terminal device is connected to a network via a communication function.

An operation section 14 includes a power supply key for turning power supply ON/OFF and the like not shown, as push-button-type keys. A touch display section 15 is structured to include a display panel 15a, a touch panel 15b, an input control section 15c, and a display control section 15d, as with the first embodiment. A wireless LAN (Local Area Network) communication section 16 is a wireless communication module capable of high-speed large-capacity communication, and is connectable to the Internet or the like via a wireless LAN router nearby (omitted in the drawing).

Figure 9:
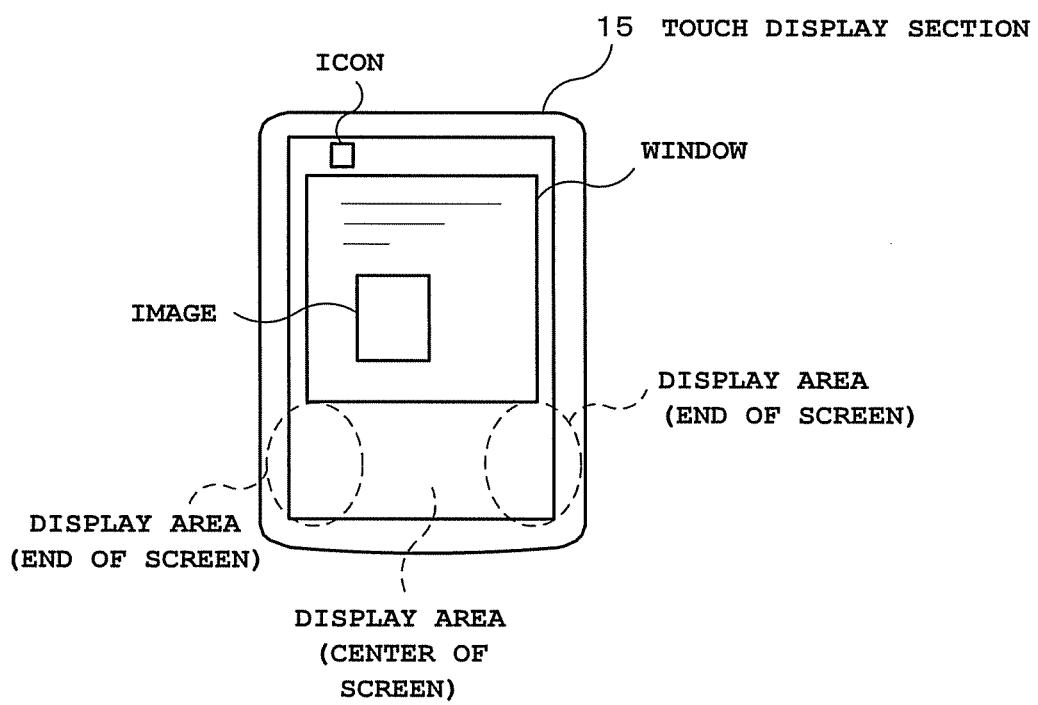
FIG. 9 is a diagram for describing an operation target when a gesture operation is performed on a touch display section 15.

FIG. 9 is a diagram for describing an operation target when a gesture operation is performed on the touch display section 15.

In the second embodiment, when a gesture operation on the touch display section 15 is detected, the CPU 11 judges the attribute of an operation target on the touch display section 15, and determines its gesture operation type according to the attribute. In the case of the drawing, operation targets on the touch display section 15 include display data (a page or an image), a display object (an image, an icon, or a window), and a display area on the screen.

Here, when a gesture operation is performed on display data (a page or an image) displayed on the touch display section 15, the display data (the page or the image) is taken as an operation target. Also, when a gesture operation is performed on a display object, the display object (an image, an icon, or a window) is taken as an operation target. When a gesture operation is performed on a display area other than display data and any display object displayed on the touch display section 15, the display area is taken as an operation target.

The attribute of an operation target herein indicates, for example, whether display data serving as an operation target is entirely within the screen or whether an image serving as an operation target is a favorite image, a printed image, a non-extended image, or an object (such as an icon or window) other than these images. This attribute also indicates whether a display object serving as an operation target is an image, an icon, or a window, or whether a display area serving as an operation target is at an end of the screen or at the center of the screen.

FIG. 10 is a flowchart of an operation of the tablet terminal device that is started in response to a gesture operation on the touch display section 15.

First, when the input control section 15c detects a gesture operation on the touch display section 15 (Step E1), the CPU 11 judges whether the operation target is display data (page or image), a display object (image, icon, or window), or a display area on the screen based on the contact point (Step E2), and determines the attribute of the operation target (Step E3).

Then, the CPU 11 determines the type of the gesture operation based on the attribute of the operation target (Step E4), and judges whether the gesture operation type is a flick operation (Step E5). When the gesture operation type is a flick operation (YES at Step E5), the CPU 11 proceeds to display scroll processing (Step E6) to scroll the display in a left or right direction according to the flick direction (contact movement direction). When the gesture operation type is a tap operation (NO at Step E5), the CPU 11 performs data selection processing for selecting data for enlarged display (Step E7) Then, the CPU 11 exits the flow of FIG. 10. Hereafter, the CPU 11 repeats the flow of FIG. 10 every time a gesture operation is performed.

As such, in the second embodiment, the CPU 11 determines a gesture operation type according to the attribute of an operation target on the touch display section 15, and performs data processing according to the gesture operation type. A specific example is as follows. When the attribute of an operation target is the window of a display object, the CPU 11 determines that the gesture operation type is a flick operation and performs display scroll processing. When the attribute of an operation target is the icon of a display object, the CPU 11 determines that the gesture operation type is a tap operation and performs display object selection processing.

Also, when an operation target is a display area and its attribute is the center of the screen, the CPU 11 determines that the gesture operation type is a flick operation and performs display scroll processing. When the attribute of an operation target is an end of the screen, the CPU 11 determines that the gesture operation type is a tap operation and performs display object selection processing.

Moreover, when an operation target is an image of display data and its attribute is a favorite image, the CPU 11 determines that the gesture operation type is a tap operation and performs image selection processing. If the image is any one of a printed image, a non-extended image, and an extension-error image, the CPU 11 determines that the gesture operation type is a tap operation and performs image selection processing. Furthermore, if the entire display data (page or image) is within the screen as the attribute of an operation target, the CPU 11 determines that the gesture operation type is a tap operation and performs display data selection processing. If the entire display data is not within the screen, the CPU 11 determines that the gesture operation type is a flick operation and performs display scroll processing.

As described above, in the second embodiment, when a gesture operation on the touch panel 15b is detected, the CPU 11 determines the attribute of the operation target, determines the gesture operation type according to the attribute of the operation target, and performs data processing according to the operation type. As a result of this configuration, determination regarding a gesture operation can be made based not only on a result of the detection of details of the operation but also on the attribute of the operation target. With such a precise determination, the user's desired operation can be performed.

Also, the CPU 11 determines a gesture operation type according to a result of the detection of details of the operation on the touch display section 15 detected by the input control section 15c. As a result of this configuration, a gesture operation on the touch display section 15 can be determined.

An operation target in the second embodiment is image data displayed on the touch display section 15. The CPU 11 determines the attribute of this image, and judges whether the gesture operation type is a tap operation or a flick operation according to this attribute. As a result of this configuration, an appropriate determination can be made. For example, a gesture operation type can be determined based on an image attribute relation where a printed image, a non-extended image, and an extension-error image have a low possibility of being selected, and a favorite image has, by contrast, a high possibility of being selected.

Another operation target in the second embodiment is data displayed on the touch display section 15. The CPU 11 judges whether the display data is entirely within the touch display section 15, as the attribute of the operation target, and judges whether the gesture operation type is a tap operation or a flick operation according to the attribute. As a result of this configuration, an appropriate determination can be made. For example, if the entire data is not within the touch display section 15, the CPU 11 judges that the gesture operation type is a flick operation because there is a high possibility of the display being scrolled. If the entire data is within the touch display section 15, the CPU 11 judges that the gesture operation type is a tap operation because there is a high possibility of the data being selected.

Another operation target in the second embodiment is a display object displayed on the touch display section 15. The CPU 11 determines the type of the display object (for example, an image, an icon, or a window) as the attribute of the display object, and judges whether the gesture operation type is a tap operation and a flick operation according to this attribute. As a result of this configuration, an appropriate determination can be made. For example, if the operation target is an image or an icon, the CPU 11 judges that the gesture operation type is a tap operation because there is a high possibility of the data being selected. If the operation target is a window, the CPU 11 judges that the gesture operation type is a flick operation because there is a high possibility of the display being scrolled.

Another operation target in the second embodiment is a display area on the touch display section 15. The CPU 11 determines the attribute of the display area, and judges whether the gesture operation type is a tap operation or a flick operation according to this attribute. As a result of this configuration, an appropriate determination can be made. For example, if the display area is an end of the screen, the CPU 11 judges that the gesture operation type is a tap operation because there is a high possibility of the display object being selected. If the display area is the center of the screen, the CPU 11 judges that the gesture operation type is a flick operation because there is a high possibility of the display of the display object being scrolled or the page being turned.

In the above-described second embodiment, an image, an icon, and a window are exemplarily described as attributes of a display object. However, it may be text or a blank. Also, in the above-described second embodiment, an end of the screen and the center of the screen are each taken as the attribute of a display area. However, it may be the upper, lower, left, or right corner.

Also, in each of the above-described embodiments, a tap operation or a flick operation is determined as a gesture operation type. However, other than the tap operation and the flick operation, for example, a contact movement operation (slide operation: drag operation), an operation where a contact point is continuously fixed (holding operation), an operation where a plurality of display points are touched with a plurality of fingers (double-tap operation), an operation for instructing enlargement of display data (pinch-out operation), or an operation for instructing reduction of display data (pinch-in operation) may be determined as a gesture operation type.

Moreover, in each of the above-described embodiments, a contact-type touch panel for detecting contact or a contact movement by a finger or a pen is exemplarily used. However, as described above, a non-contact-type touch panel or an operation detection device may be used which detects the position of a finger or a pen based on change in capacitance or brightness due to the approach or approach movement of the finger or the pen. In addition, an imaging device which images a hand motion and a body motion may be used. That is, the means to detect a gesture operation may be arbitrarily determined.

Furthermore, in the above-described first embodiment, the present invention has been applied to a printer device as a data processing device. Also, in the above-described second embodiment, the present invention has been applied to a tablet terminal device as a data processing device. However, the present invention is not limited thereto, and may be applied to a personal computer, a PDA (Personal Digital Assistance), a portable phone, a digital camera, a music player, or the like.

Still further, the "devices" or the "sections" described in each of the above-described embodiments are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A data processing device including a detection section which detects a plurality of gesture operations including gesture operations of types of flick operations or gesture operations of types of tap operations, comprising:
    a judging section which, when a new gesture operation by the detection section is detected, judges whether the detection is detection after a first time is elapsed since predetermined data is displayed on the data processing device, or is detection after a second time is elapsed since a previous gesture operation is detected in the data processing device, or is detection after a third time is elapsed since a display size of an image displayed on the data processing device is changed;
    an updating section which updates any of a first pointer in which the types of flick operations are prioritized and a second pointer in which the types of tap operations are prioritized according to a result of one type of judgment of the judging section, and, when plural types of judgments are detected in the judging section, updates by respectively accumulating the first pointer and the second pointer for each of the plural types of judgments;
    a data processing section which performs a comparison of the first pointer and the second pointer accumulated and updated in the updating section and determines whether the types of flick operations or the types of tap operations are used as a type of the gesture operation based on a result of the comparison;
    a reading section to read an attribute of the image displayed on the data processing device from an image memory and, according to the attribute, judging whether the image is a printed image, a non-extended image, or an extension error image; and
    if the image is a printed image, a non-extended image, or an extension error image, determining that the image has a low possibility of being selected.

2. The data processing device according to claim 1, wherein the updating section,
    when judged that the detection of the gesture operation is detection within the first time, updates the first pointer in which the types of flick operations are prioritized; and
    when judged that the detection of the gesture operation is detection after the first time, updates the second pointer in which the types of tap operations are prioritized.

3. The data processing device according to claim 1, wherein the updating section,
    when judged that the detection of the gesture operation is detection within the second time, updates the first pointer in which the types of flick operations are prioritized; and
    when judged that the detection of the gesture operation is detection after the second time, updates the second pointer in which the types of tap operations are prioritized.

4. The data processing device according to claim 1, wherein the judgment in the judging section is performed when a type of the gesture operation detected by the detection section is narrowed to a plurality of gesture operation types.

5. The data processing device according to claim 1, wherein the updating section performs an analysis of details of the detected gesture operation, and, when possibilities cannot be narrowed to one gesture operation type based on a result of the analysis, updates any of the first pointer and the second pointer according to a judgment result of the judging section.

6. The data processing device according to claim 1, wherein the updating section performs an analysis of details of the detected gesture operation and designates a combination of a plurality of gesture operation types as an update candidate, based on a result of the analysis, and updates any of the first pointer and the second pointer according to a judgment result of the judging section.

7. A method for a data processing device including a detection section which detects a plurality of gesture operations including gesture operations of types of flick operations or gesture operations of types of tap operations, comprising:

a judging step of, when a new gesture operation by the detection section is detected, judging whether the detection is detection after a first time is elapsed since predetermined data is displayed on the data processing device, is detection after a second time is elapsed since a previous gesture operation is detected in the data processing device, or is detection after a third time is elapsed since a display size of an image displayed on the data processing device is changed;

an updating step of updating any of a first pointer in which the types of flick operations are prioritized and a second pointer in which the types of tap operations are prioritized according to a result of one type of judgment of the judging, and, when plural types of judgments are detected in the judging, updating by respectively accumulating the first pointer and the second pointer for each of the plural types of judgments; and a data processing step of performing a comparison of the first pointer and the second pointer accumulated and updated in the updating section and determining whether the types of flick operations or the types of tap operations are used as a type of the gesture operation based on a result of the comparison;

a reading step of reading an attribute of the image displayed on the data processing device from an image memory and, according to the attribute, judging whether the image is a printed image, a non-extended image, or an extension error image; and if the image is a printed image, a non-extended image, or an extension error image, determining that the image has a low possibility of being selected.

* * * * *